United States Patent

[11] 3,553,459

[72] Inventors Melvin P. Siedband
Baltimore;
Robert A. Boenning, Timonium, Md.

[21] Appl. No. 736,226
[22] Filed June 11, 1968
[45] Patented Jan. 5, 1971
[73] Assignee Westinghouse Electric Corporation
Pittsburgh, Pa.
a corporation of Pennsylvania

[54] SOLID STATE POWER SUPPLY FOR AN IMAGE AMPLIFIER
9 Claims, 1 Drawing Fig.

[52] U.S. Cl. ........ 250/205, 313/65; 315/14, 315/151; 321/2; 331/117
[51] Int. Cl. ........ H01j31/30; H02m 3/32: H05b 41/38
[50] Field of Search ........ 313/65; 315/151, 14; 321/2; 331/117; 250/205

[56] References Cited

UNITED STATES PATENTS

| | | | |
|---|---|---|---|
| 2,840,755 | 6/1958 | Longini ........ | 313/65X |
| 2,903,596 | 9/1959 | Reed ........ | 313/65X |
| 3,243,683 | 3/1966 | Ackley ........ | 321/2 |
| 3,358,217 | 12/1967 | Deelman ........ | 315/151X |
| 3,456,155 | 7/1969 | Buchanan ........ | 315/151 |

*Primary Examiner*—James W. Lawrence
*Assistant Examiner*—C. R. Campbell
*Attorneys*—F. H. Henson, C. F. Renz and A. S. Oddi

ABSTRACT: A power supply for use with a high voltage device, such as an image amplifier tube, is disclosed wherein the frequency of a tunable oscillator is adjusted so that there is optimum power translation through the transformer of the power supply to a voltage multiplier network, which may include a plurality of voltage doublers connected in series. The multiplied voltage is used for supplying the high voltage electrode of the device utilized such as the anode screen element of an image amplifier tube. A voltage divider network is provided to receive a portion of the multiplied voltage and includes a plurality of potentiometers for selecting various operating voltages which may be applied to various electrodes of a high voltage device, such as electronic lens elements of an image amplifier tube. A plurality of low voltage switches are utilized with the voltage divider network for changing the operating levels of the device such as the magnification of an image amplifier tube.

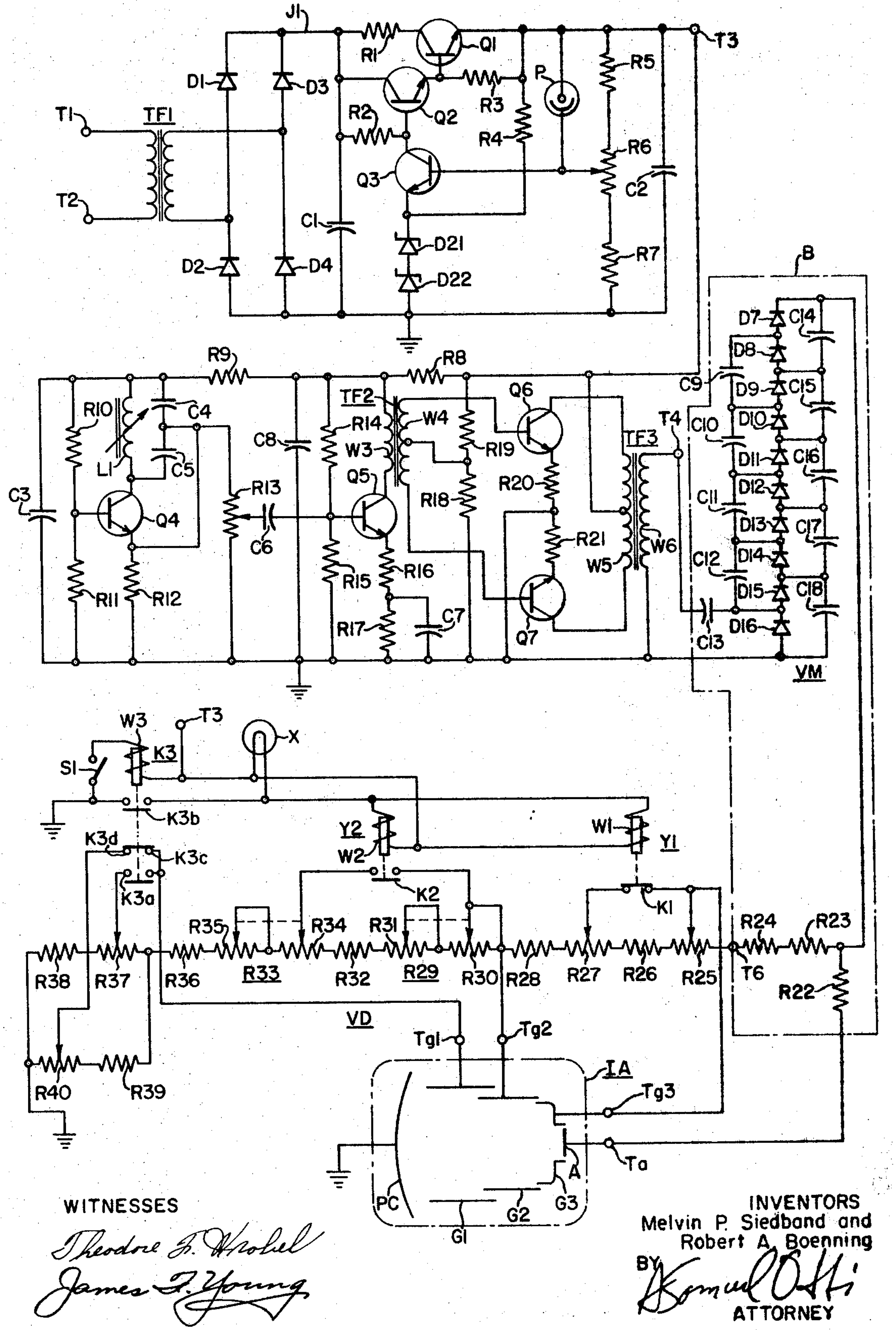
WITNESSES
Theodore F. Wrobel
James F. Young
INVENTORS
Melvin P. Siedband and
Robert A. Boenning
BY Samuel Otti
ATTORNEY

SOLID STATE POWER SUPPLY FOR AN IMAGE AMPLIFIER

BACKGROUND OF THE INVENTION

1. Field of the Invention

The present invention relates to high voltage power supplies and, more particularly, to high voltage power supplies for supplying the operating potentials for high voltage devices.

2. Discussion of the Prior Art

An image amplifier tube may be used to great advantage for providing high brightness X-ray images compared to those produced by conventional fluoroscopic screens. The power supply required for supplying the operating potentials for an image amplifier tube must meet specific design standards. That is, the power supply must be capable of supplying an anode voltage of 25 to 30 kilovolts DC and also various electronic lens voltages ranging from 100 volts DC and lower to 7000 volts DC. There are however minimum current demands made by image amplifiers. Presently it is standard practice to use a conventional 60 Hz. power supply, usually in the form of a voltage doubler, to supply the various operating potentials for the image amplifier. The voltage doubler is usually enclosed in an oil-filled container placed some distance from the image amplifier tube. A high voltage cable is utilized to supply the anode voltage of the amplifier tube from the output of the voltage doubler, and another high voltage cable is used to supply a voltage divider network which in turn develops the electronic lens voltages of the image amplifier tube. The pair of high voltage cables must be of the shielded type and be capable of withstanding 30 kilovolts. Such cables are quite expensive, consume a large amount of space and introduce distributed capacitance into the system which may adversely affect the focusing of the image amplifier.

The voltage divider network normally used for supplying the electronic lens of the image amplifier tube also presents problems. First, resistors used at such high voltages tend to deteriorate with time causing the resistance thereof to decrease which adversely affects the operation of the tube. Second, repeated adjustments of the slider arms of potentiometers used in the voltage divider network designed for high voltage insulation causes metal particles to be deposited on the resistance element thereof thereby decreasing its resistance value.

For the effective use of an image amplifier, it is highly desirable to be able to change the electronic lens voltages of the image amplifier tube in order to change the magnification of the image amplifier tube between two values. A straightforward technique of switching the electronic lens voltages is to use two separate voltage divider networks and to use relays to switch between the two networks. However, a special high voltage relay must be used to sustain the high voltages utilized, and it is usually necessary to submerge the relay in oil or to use a special vacuum relay.

It would thus be highly desirable to provide a power supply for a high voltage device, such as an image amplifier, which provides high efficiency power transfer to the amplifier, eliminates the need for high voltage cable, does not suffer from high voltage deterioration and permits the use of relatively inexpensive relays for mode switching of the device.

SUMMARY OF THE INVENTION

Broadly, the present invention provides a power supply for supplying the operating potentials of a high voltage device wherein the frequency of a power supply oscillator is tuned to provide optimum power transfer through a transformer of the supply to a voltage multiplier circuit. The multiplying factor of the multiplier circuit is selected to provide desired high voltage necessary for the high voltage device. A voltage divider network is utilized for supplying other operating potentials required by the device and may be set to two different states for effecting operation of the high voltage device in at least two different modes.

BRIEF DESCRIPTION OF THE DRAWING

The single FIG. is a schematic diagram of the power supply of the present invention and is shown supplying the operating potentials for an image amplifier tube.

DESCRIPTION OF THE PREFERRED EMBODIMENT

Referring to the FIG. input power, which may comprise 120 volts, 60 Hz., is applied to a pair of terminals T1 of the primary winding W1 of an input transformer TF1. The secondary winding W2 of the transformer TF1 is connected across the input of a full wave rectifier bridge including diodes D1, D2, D3 and D4. A full wave rectified output approximately +32 volts, for example, is produced between a circuit point J1 at cathode connection of diodes D1 and D3 and the anode connections of the diodes D2 and D4 at ground. A filter capacitor C1 is connected between the point J1 and ground. A transistor Q1 is provided and is connected as an emitter follower. The collector of the transistor Q1 is connected via a resistor R1 to the positive circuit point J1, and the emitter of the transistor Q1 is connected to a terminal T3 which supplies the filtered and regulated DC output of the input power supply, which may be, for example, +24 volts. A transistor Q2 is provided which has its emitter connected to the base of the transistor Q1 and its collector connected to the circuit point J1. The transistor Q2 is operative to control the conductivity of the transistor Q1 and thereby increase the current sensitivity thereof. The base of the transistor Q2 connected to the circuit point J1 via a resistor R2, and the emitter thereof is connected via a resistor R3 to the emitter of the transistor Q1. The transistor Q2 is fed by a transistor Q3 which has its collector connected to the base of the transistor Q2, and its emitter tied to a voltage reference which includes a pair of Zener diodes Dz1 and D z2 connected between the emitter of the transistor Q3 and ground. The Zener diodes Dz1 and Dz2 are energized by way of a resistor R4 which is connected between the emitter of the transistor Q1 and the cathode of the Zener Dz1 at the emitter of the transistor Q3. A voltage divider network including a resistor R5, a potentiometer R6 and a resistor R7 is connected between the emitter of transistor Q1 and ground and is used for setting the base voltage of the transistor Q3 which is connected to the slider arm tap on the potentiometer R6. Hence, if the output voltage at the terminal T3 increases, the voltage at the tap of the potentiometer R6 at the base of the transistor Q3 also increases thereby increasing the conductivity of the transistor Q3, which, in turn, decreases the conductivity of the transistor Q2 which then decreases the conductivity of the transistor Q1 to decrease the output voltage at the terminal T3. Thus, a substantially constant voltage, for example +24 volts, is maintained at the terminal T3 with respect to ground. A filter capacitor C2 is connected between the terminal T3 and ground to eliminate any high frequency variations at the terminal T3 with respect to ground.

The DC output at the terminal T3 is utilized to supply the operating power for a tunable oscillator including a transistor Q4. The terminal T3 is coupled via resistors R8 and R9 and a variable inductor L1 to the collector of the transistor Q4. Bias resistors R10, R11 are connected between a junction point J2, at the junction of the inductor L1 and the resistor R9, and ground. The base of the transistor Q4 is connected to a junction point J3 between the resistors R10 and R11. A filter capacitor C3 is also connected between the junction point J2 and ground. The transistor Q4 includes an emitter resistor R12 connected between the emitter thereof and ground. The emitter of the transistor D4 is coupled to a junction point J4 between a pair of capacitors C4 and C5. The free end of the capacitor C4 is connected to the junction point J2, and the free end of the capacitor C5 is connected to the collector of the transistor Q4 to complete the tunable oscillator circuit.

The circuit components are so selected that the oscillator may be variably tuned to oscillate between approximately 2500 to 4500 Hz. by the adjustment of the tuning inductor L1, which may be a movable core type of tuning inductor. The amplitude of the output voltage of the oscillator is controlled via a potentiometer R13 which is connected between the junction point J4 and ground. The oscillator output voltage is then taken from the tap of the potentiometer R13 and passed through a coupling capacitor C6 to the base of an audio amplifier transistor Q5. Biasing resistors R14 and R15 provided for the transistor Q5 and are connected between a junction point J5 between the resistors R8 and R9 and ground, with the base of the transistors Q5 connected to the junction between the resistors R14 and R15. The transistor Q5 is made slightly degenerate by the use of an emitter resistor R16 and is current biased through the parallel combination of a resistor R16 and capacitor C7 connected between the bottom end of the resistor R16 and ground. A filter capacitor C8 is connected between junction point J5 and ground.

The output of the transistor Q5 at the collector thereof feeds the primary winding W3 of a driver transformer TF2. The other end of the winding W3 is connected to the positive junction circuit point J5 to supply operating voltage to the collector of the transistor Q5. The secondary winding W4 of the driver transformer TF2 is center tapped, the center tap being connected to a junction point between a pair of resistors R18 and R19. The free end of the resistor R19 is connected to the terminal T3, and the free end of the resistor R18 is connected to ground. The ends of the secondary winding W4 of the transformer TF2 are connected, respectively, to the base electrodes of a pair of transistors Q6 and Q7. The driver transformer TF2 is designed to provide good coupling in a frequency range of 2500 to 4500 Hz. and may include a ferrite core.

The transistors Q6 and Q7 are operative in a class B push-pull mode, with the emitters thereof being respectively coupled to ground via emitter resistors R20 and R21. The collectors of the transistors Q7 and Q8, respectively, supply the ends of the primary winding W5 of an output transformer TF3. The primary winding W5 includes a center tap which is returned to the terminal T3 for supplying operating potential to the transistors Q7 and Q6. The transformer TF3 includes a secondary winding W6 having one end grounded and the other end connected to a terminal T4. The terminal T4 is the supply terminal for a voltage multiplier circuit VM, with, for example, 2200 volts KMS being developed between T4 and ground. The voltage multiplier circuit VM includes a first group of five capacitors connected in series designated C9, C10, C11, C12 and C13 and a second group of five capacitors connected in series designated C14, C15, C16, C17 and C18; and also includes a series chain of 10 diodes designated D7 through D16 which are connected in series from anode to cathode between ground and a terminal T5 which acts as the high voltage output terminal for the power supply. The free end of the capacitor C13 is connected to the terminal T4, and the free end of the capacitor C16 is connected to ground as is the anode of the diode D16. The free end of the capacitor C14 is connected to the terminal T5 and the free end of the capacitor C9 is connected to the anode of the diode C7. The junctions of the capacitors C9–C10, C10–C11, C11–C12, C12–C13 are connected, respectively, to the junctions between diodes D9–D10, D11–D12, D13–D14, D15–D16. The junctions between the capacitors C14–C15, C16–C17 and C17–C18, respectively, are connected to the junctions between the diodes D8–D9, D10–D11, D12–D13 and D14–D15. The voltage multiplier circuit, as described, is a variation of the Cockcroft-Walton circuit which is operative to multiply and rectify the AC input voltage thereto across terminal T4 to ground and provide a direct current voltage at the terminal T5 multiplied by a factor of 10. Another way of describing the voltage multiplier is that it comprises five voltage doublers which are stacked one on top of the other to provide total multiplying factor of 10. For example, one voltage divider would comprise capacitors C13 and C18 and diodes D15 and D16. The DC output appearing at the terminal T5 with respect to ground is then between approximately 25 to 30 kilovolts. In the configuration as shown for the voltage multiplier the maximum voltage applied across any of the ten capacitors thereof and the approximate inverse voltage seen across each of the diodes is approximately 6000 volts. This permits use of the relatively inexpensive diodes and capacitors for this type of rectification operation without the need for bleeder resistors which are usually required to maintain voltage equalization between components used in a series chain in a conventional half-wave or full-wave rectifier system. Moreover, the relatively high operating frequency of 2.5 to 4.5 KHz. permits the use of the low values for filtering and coupling capacitors employed in the circuit.

The output transformer TF3 has a rather high secondary to primary voltage ratio and in this case, it is very difficult to couple energy through the transformer TF3 which has a tendency to resonate at its resonant frequency which will decouple any signals other than those near its resonant frequency. It is quite difficult to tune a transformer such as the transformer TF3 to any predetermined frequency. In the present inventions the necessity for accurately tuning the transformer TF3 to a predetermined frequency is eliminated by adjusting the tuned frequency of the tunable oscillator, including the transistor Q4, to a frequency corresponding to the resonant frequency of the particular transformer TF3 utilized in each power supply circuit. The design of the transformer TF3 if controlled so that its resonant frequency will fall within a range of for example 2 to 5 KHz. If the resonant frequency is selected too low, it is necessary to use very large capacitors in the voltage multiplier circuit. On the other hand, if the resonant frequency is designed to be too high, an inexpensive diode can no longer be utilized. Thus the resonant frequency of the transformer TF3 is selected to be within a range of resonant frequencies, and then the tuned frequency of the oscillator-transistor circuit is adjusted by the inductor L1 to provide optimum coupling of energy from the oscillator, through the audio amplifier Q5, the push-pull amplifier Q6–Q7 and then through the output transformer TF3. In actual operation the setup procedure of the described power supply is such that the inductor L1 and the potentiometer R13 are adjusted so that the output transistors Q6 and Q7 receive a minimum amount of current to provide the desired high voltage output at the terminal T5 of for example 25,000 volts. The oscillator frequency is adjusted via the inductor L1 until optimum power transfer is achieved through the transformer TF3 into the voltage amplifier circuit. The potentiometer R13 serves to adjust the output voltage level of the oscillator to permit minimum current to be supplied to the output transistors Q6 and Q7 while still providing the desired output level of 25,000 volts at the terminal T5. The circuit as described is also short circuit proof, in that, if an actual short-circuit should occur, the circuit does not destroy itself but rather stops producing a current output which prohibits the generation of the high voltage output of the power supply.

The high DC voltage appearing at the terminal T5 is applied via a series anode protective resistor R22 to the anode screen element electrode A of an image amplifier tube generally indicated on the drawing by IA. The high voltage at the terminal T5 is also applied via a pair of resistors R23 and R24 to a terminal T6 which comprises the high voltage end of a voltage divider used for supplying the various electronic lens elements of the image amplifier tube IA, which is generally designated as VD on the drawing. The resistor R22 in series with the anode electrode may for example be a 20 megohm, three watt resistor. The resistors R23 and R24 supplying the voltage divider VD may each consist of 100 megohm resistors.

The resistors R22, R23, R24 and the components of the voltage multiplier circuit comprising the capacitors C9 through C18 and the diodes D7 through D16 may be conveniently encapsulated together in a suitable insulating material. For example, these components may be assembled in a container, generally indicated by the dotted box B on the drawing. The container B may for example comprise a plastic box filled with a compound designated by the trade name Sylgard 184 manufactured by the Dow Corning Corporation. Such encapsulation has been found to be capable of sustaining voltage of 50,000 volts. Because of the small size of the components required in the voltage multiplier circuit and the small size of the resistors R22, R23, and R24, the container B including these components may be placed adjacent the image amplifier tube IA and the voltage divider VD, thereby eliminating the requirement for the high voltage shielded cables as previously required when using the voltage doubler type of power supply wherein it is necessary to submerge the voltage doubler components in an oil bath. The plastic box containing the voltage multiplier input resistor components can be mounted directly on the image amplifier or on neighboring structures.

The image amplifier IA includes a photocathode PC upon which an X-ray images. The photocathode PC produces an electron image which is focused and accelerated under the effect of electronic lens elements G1, G2 and G to impinge on the anode screen element A. The light output of the anode screen element is of an increased intensity but of a decreased size as compared to the image on the photocathode PC. For example, the image amplifier might have a 9 inch input to the photocathode PC thereof to produce a 1 inch output at the anode screen element A for a particular set of voltages applied to the electronic lens G1, G2 and G3. By a different selection of electronic lens voltages for the elements G1, G2 and G3 a 6 inch portion of the input image may be focused at the 1 inch anode screen output. The voltage divider VD is so designed to permit the operation of the image amplifier tube IA in two different magnification modes.

Starting at the high voltage end of the voltage divider VD it includes a potentiometer R25 having one end connected to the terminal T6 and the other end connected through a fixed resistor R26 to one end of a potentiometer R27. The tap on the potentiometer R25 is connected to a terminal T*g*3 which is connected to the third electronic lens element G3 of the image amplifier IA. The tap on the potentiometer R25 is also connected via a pair of contacts K1 of a relay Y1 to the tap on the potentiometer R27. The relay Y1 comprises a normally closed type with the contacts K1 being closed as shown until a winding W1 of the relay is energized. With the various relay contacts and switches in the position as shown on the drawing, the image amplifier tube IA is in one mode of operation. As shown, the tube is in a first mode of operation, for example, for converting a 9 inch image on the photocathode PC to a 1 inch image on the anode screen element A.

The bottom end of the potentiometer R27 is connected through a fixed resistor R28 to one end of a dual potentiometer R29 which includes a first section R30 and a second section R31 with each of the sections R30 and R31 having separate taps thereon which are mechanically ganged together. The tap on the potentiometer section R30 is connected to the junction between the top end of the resistor R30 and the resistor R28, with a terminal T*g*2 being connected to the junction for supplying the second electronic lens element G2. The bottom end of the dual potentiometer section R31 is connected via a fixed resistor R32 to the top end of a second dual potentiometer R33 which includes a top section R34 having a tap thereon and a bottom section R35 having a tap thereon which is connected to the junction between the sections R34 and R35. The tap on the top potentiometer section R34 is mechanically coupled to the tap on the potentiometer section R35 and is electrically connected to a pair of contacts K2 of a second reed relay Y2 which has a coil W2 connected in parallel with the coil W1 of the relay Y1. Contacts K2 are electrically connected to the tap on the potentiometer section R30 where the terminal T*g*2 is connected. The relay Y2 is normally open as shown. The relays Y1 and Y2 may comprise relatively inexpensive vacuum type reed relays of the single pole, single throw variety which need only be capable of sustaining voltages of the order of 5 KV.

The bottom end of the dual potentiometer section R35 is connected via a fixed resistor R36 to the top end of a potentiometer R37, which has its bottom end connected through a fixed resistor R38 to ground. A series circuit including a fixed resistor R39 and a potentiometer R40 is connected between the top end of the potentiometer R37 and ground. The tap on the potentiometer 37 is connected to a contact K3*a* of a relay Y3 which also includes a pair of normally open contacts K3*b* and a pair of normally closed contacts K3*c*—K3*d* which are in that position when the coil W3 thereof is in its unenergized state. The contact K3*c* is connected to the tap on the potentiometer R40, with the terminal T*g*1 being connected to the contact K3*d* for applying the potential to the first electronic lens element G1 of the image amplifier IA. When W3 is energized the tap on potentiometer R37 is connected to the terminal T21 and the tap on potentiometer R40 disconnected therefrom. The relay Y3 may be a relatively low voltage one since voltages present at the lower end of the voltage divider are relatively low in the order of several hundred volts.

The voltage for supplying the coils W1, W2 and W3 of the respective relays Y1, Y2 and Y3 is supplied from the position terminal T3 which is connected to a common end of the coils W1, W2 and W3. The other end of the commonly connected coils W1 and W2 is returned via contacts K3*b* to ground. A mode switch S1 is connected between the other end of the coil W3 and ground and is in the open position as shown when the contacts of the various relays are in the position as shown with none of the coils W1, W2 or W3 being energized.

In the mode of operation as shown, an electronic lens voltage of, for example, approximately 3500 volts would be applied to the third electronic lens element G3, approximately 3200 volts to the lens element G2 and approximately 50 volts or less to lens element G1.

By closing the mode switch S1 a second mode of operation of the image amplifier IA is brought about for producing, for example, a 1 inch intensified output from a 6 inch portion of an image on the photocathode PC. With the switch S1 closed, the coil W1 is energized to open the set of contacts K1; the coil W2 is energized to close the set of contacts K2 and the coil W3 is energized to close the contacts K3*b* which energizes a mode indicator light X, which is connected between the terminal T3 and the contacts K3*b* and to cause the circuit to be opened between the contacts K3*c* and K3*d* and to close the circuit between the contacts K3*c* and the contacts K3*a*. With the set of contacts K1 open, the voltage at the terminal T*g*3 increases to, for example, 7,000 volts which is supplied to the lens element G3. The closing of the contacts G2 causes the voltage at the terminal T*g*2 to drop to, for example, 800 volts thereby providing a large voltage difference of, for example, 6200 volts between the lens elements G3 and G2 as required for this mode of operation. The circuit connection of the contacts K3*c* and K3*a* connects the tap on the potentiometer R37 to the first lens element G1 for applying, for example, a voltage of 150 volts thereto.

Since the current passing through the voltage divider VD is substantially constant independent of the mode of operation, the use of the dual potentiometers R29 and R23 provides the advantage of essentially doubling the range of variation for the second lens element G2 voltage. The top dual potentiometer R29 in the present example provides approximately a 600 volt variation for its extreme settings. With the top end of the second dual potentiometer R33 connected to the bottom end of the dual potentiometer R29 via the resistor R33, an additional 500 to 600 volts of variation can be attained to thereby increase the overall range of control provided by the dual potentiometers R29 and R33 to over a kilovolt.

The use of the single throw, single pole reed relays K1 and K2, which short out various sections the voltage divider VD for the different modes of operations, permits the use of a single voltage divider rather than requirement for two separate voltage divider networks as those required in the prior art. Moreover, the employment of relatively low voltage, single throw, single pole, reed relays is much less expensive than using a special high voltage three-pole double-throw relay as required for switching between the two voltage divider networks of the prior art system.

An additional feature of the present invention is the provision for brightness stabilization which acts to provide feedback correction for any variations in the light output of the amplified images from the anode screen element A of the image amplifier tube IA. This is provided via the use of a photoconductive cell P which is connected electrically between the terminal T3 and the tap on the potentiometer R6. The photoconductive cell P is disposed physically to receive a portion of the light output of the anode screen element A of the image amplifier IA so that the conductivity of the cell P responds to the light output thereof. The photoconductive cell P may, for example, comprise a cadmium sulfide cell. Assuming that the light output from the image amplifier should increase above a desired level, the increased light output would cause the photoconductive cell P to pass an increased current therethrough from the terminal T3 to the base of the transistor Q3 whose conductivity would increase in response thereto. The increased conductivity transistor Q3 decreases the conductivity of the transistor Q2 and in response thereto the conductivity of the transistor Q1 decreases. With the transistor Q1 less conductive the voltage appearing at the terminal T3 decreases, thereby lowering the power output supplied to the image amplifier which would therefore reduce the intensity of light appearing at the anode screen element A. Thus, with the light feedback to the photoconductive cell P, the system will provide a substantially stable light output from the image amplifier IA.

The above power supply system has been described with reference to an X-ray image amplifier tube. However, it should be understood that the power supply system could be readily modified to provide regulated voltages efficiently in the range of 5000 to 50,000 volts DC, so that it can be used with such tubes as infrared image detectors and other forms of image intensifiers.

Although the present invention has been described with a certain degree of particularity, it should be understood the present disclosure has been made only by way of example and that numerous changes and details of circuitry and the combination and arrangement of parts, elements and components can be resorted to without departing from the spirit and the scope of the present invention.

We claim:

1. In a high voltage supply for a high voltage device including a high voltage electrode and a plurality of other electrodes, the combination of:
tunable oscillator means for providing oscillating signals at a selectable frequency;
transformer means for providing output signals in response to said oscillating signals;
voltage multiplier circuit means for multiplying said output signals by the multiplying factor thereof to provide a high voltage unidirectional output;
said oscillator means being tunable to provide substantially optimum power transfer through said transformer means to said voltage multiplier circuit means;
means for supplying said high voltage output to said high voltage electrodes of said device;
voltage divider means responsive to said high voltage output for providing respective operating voltages to said plurality of other electrodes of said device,
said voltage multiplier circuit means including a plurality of voltage doubler circuits operatively connected in series for providing the desired multiplying factor for said voltage multiplier circuit means; and
encapsulating means disposed adjacent to said device for encapsulating said voltage divider circuit means and said means for supplying said high voltage output to said high voltage electrode of said device.

2. The combination of claim 1 wherein said voltage divider means includes switching means for switching between different of said respective operating voltages provided by said voltage divider means.

3. The combination of claim 1 wherein:
said transformer means includes primary and secondary windings and having a resonant frequency falling within a predetermined range;
said tunable oscillator means includes an oscillator circuit including a variable element for tuning said oscillator circuit to substantially the resonant frequency of said transformer means; and including:
amplifying means for amplifying said oscillatory signals and applying the signals to the primary winding of said transformer said output signals being supplied from said secondary winding across said plurality of voltage doubler circuits; and
regulated power supply means for providing a regulated operating voltage output for supplying said oscillator and said amplifier means.

4. The combination of claim 3 wherein:
said high voltage device comprises an image amplifier tube includes an anode screen element as said high voltage electrode and a plurality of electronic lens elements as said plurality of other electrodes and wherein:
said voltage divider means includes switching means for switching between different values of said respective operating voltage for effecting operation of said image amplifier tube in at least two different modes of operation.

5. The combination of claim 4 including a photoresponsive element responsive to the light output of said image amplifier tube for varying the operating voltage level of said regulated power supply means in response thereto so that a substantially constant light output is provided by said image amplifier tube.

6. In a high voltage supply for supplying a high voltage device including a high voltage electrode and a plurality of other electrodes, the combination of:
means for generating a high voltage unidirectional output;
means for applying said high voltage unidirectional output to said high voltage electrode of said device;
voltage divider means including a resistive network, having a plurality of tap points thereon and switching means operative in a first or a second state;
means for applying said high voltage unidirectional output to one end of said resistive network, with the other end thereof being connected to a reference potential;
said switch means operative when in said first state to effect the development of a plurality of first voltage levels at the respective of said plurality of tap points and when in said second state to effect the development of a plurality of second voltage levels at the respective of said plurality of tap points; and
terminal means for receiving said first or second voltage levels for application to the respective of said plurality of said other electrodes of said device.

7. The combination of claim 6 wherein said plurality of tap points being each adjustable to vary said first and second voltage levels.

8. The combination of claim 7 wherein:
said switching means including a plurality of relays each includes contacts and a coil for controlling the open or closed state of said contacts;
a first relay of said plurality of relays including first contacts for opening or closing a circuit between first and second tap points of said plurality of tap points in response to the excitation state of the coil thereof;
a second relay of said plurality of relays including second contacts for opening or closing a circuit between third and fourth tap points of said plurality of tap points in response to the excitation state of the coil thereof;
a third relay of said plurality of relays including third contacts for opening or closing a circuit between fifth or sixth tap points of said plurality of tap points and one of said plurality of terminal means in response to the energization state of the coil thereof; and means for establishing the energization state of the respective coils of said first, second and third relays so that said first voltage levels or said second voltage levels are established in response thereto.

9. The combination of claim 8 wherein:
said means for generating includes:

tunable oscillator means for providing oscillating signals at a selectable frequency;

transformer means having a resonant frequency falling within a predetermined range for providing output signals in response to said oscillating signals; and voltage multiplier circuit means for multiplying said output signals by the multiplying factor thereof to provide a high voltage unidirectional output; and said oscillator means being tunable to provide substantially optimum power transfer through said transformer recess to said voltage multiplier circuit means.

UNITED STATES PATENT OFFICE
CERTIFICATE OF CORRECTION

Patent No. 3,553,459 Dated Jan. 5, 1971

Inventor(s) Melvin P. Siedband and Robert A. Boenning

It is certified that error appears in the above-identified patent and that said Letters Patent are hereby corrected as shown below:

Claim 1, column 7, line 65, delete "divider" and insert -multiplier-.

Signed and sealed this 2nd day of May 1972.

(SEAL)
Attest:

EDWARD M.FLETCHER,JR.
Attesting Officer

ROBERT GOTTSCHALK
Commissioner of Patents